United States Patent
Phillips

[15] 3,663,860
[45] May 16, 1972

[54] SHORT CIRCUIT PROOF FLASHER CIRCUIT

[72] Inventor: Robert A. Phillips, Scottsdale, Ariz.

[73] Assignee: Motorola, Inc., Franklin Park, Ill.

[22] Filed: Feb. 25, 1970

[21] Appl. No.: 14,015

[52] U.S. Cl. ..............................315/200, 315/205, 315/208, 315/225
[51] Int. Cl. ......................................................H05b 37/00
[58] Field of Search ................328/8; 317/33 R; 307/202; 331/62; 330/26; 315/86, 102, 104, 127, 160, 171, 172, 175, 176, 179, 185, 200, 205, 208, 224, 225, 360, 362

[56] References Cited

UNITED STATES PATENTS 3,461,399  8/1969  Houpis et al..............................331/62
3,263,119  7/1966  Scholl................................315/127 X Primary Examiner—Roy Lake
Assistant Examiner—Lawrence J. Dahl
Attorney—Mueller & Rauner

[57] ABSTRACT

Load current control circuitry including means for generating a driving signal with a predetermined duty cycle. Current control circuit means are connected between a load terminal and the generating means and provide different and selected levels of load current to an electrical load which is connected to the load terminal. The first level of current is that required during the initial energization of the load, and this initial current is provided by a starting network within the current control circuit means. The current control circuit means also includes a load steady state current supply and short circuit protection circuit which is connected between the generating means and the electrical load. The latter circuit is responsive to a predetermined voltage developed across the electrical load for providing a steady state DC current to the load after the latter has been initially energized.

11 Claims, 2 Drawing Figures

INVENTOR.
Robert A. Phillips
BY
Mueller, Aichele & Raumer
ATTY'S.

3,663,860

SHORT CIRCUIT PROOF FLASHER CIRCUIT

BACKGROUND OF THE INVENTION

This invention relates generally to power control circuits for lamps or other electrical loads which have a high initial turn on current. More particularly, this invention relates to an overload and short circuit protection circuit for flashing type lamps or pulsed reactive loads.

Solid state power control circuitry has been frequently used in the past to connect and disconnect an electrical load to a power source, and these circuits have employed a variety of solid state circuit components, including power transistors and silicon controlled rectifiers (SCRs). These solid state power components are commonly connected between a power supply terminal and an electrical load, and are selectively energized by various types of power control circuitry to connect and disconnect the electrical load to the power supply. Included in this general class of power control circuits are those circuits referred to as lamp flashers, and these flasher circuits range in application from automobile turn signal control to navigational beacons.

Although these prior art solid state power control circuits overcome many of the disadvantages associated with mechanically operated lamp flashers, such as wear and failure of moving parts and slow operational speeds, these prior art circuits failed to provide the often required different load current demands for certain lamp flasher applications. That is, the electrical loads of these prior art circuits, such as an incandescent lamp, were either totally energized by full load current or totally de-energized by being disconnected from the power supply; and no provision was made by any of these known prior art power control circuits for varying the load current demands of the electrical loads.

SUMMARY OF THE INVENTION

An object of the present invention is to provide a new and improved solid state power control system for switching different levels of current to a variable electrical load.

Another object of this invention is to provide a new and improved power control circuit for flashing lamps. This circuit provides short circuit protection with the same components that provide varying levels of load current to an electrical load, such as an incandescent lamp.

FEATURES

A feature of this invention is the provision of a load starting network connected between a square wave generator and an electrical load for providing an energizing turn-on current to the load.

Another feature of this invention is the provision of load steady state current supply circuitry connected between the square wave generator and a load terminal. This latter circuitry is responsive to a feedback voltage developed across a variable electrical load at a load terminal for periodically applying full load current to the load after an initial energizing turn-on current is applied to the load.

Another feature of this invention is the provision of a DC pulse amplifier and a current limiting impedance serially connected to the variable load and responsive to a periodic gating voltage at the output of a pulse forming circuit to periodically apply a limited turn-on current to the load.

Another feature of this invention is the provision of a power transistor directly connecting a power supply terminal with the electrical load. This power transistor is responsive to a periodic voltage at the output of a gating circuit (within said load steady state current supply and short circuit protection circuit) to apply full load current to the variable load after the latter has been initially energized.

Another feature of this invention is the provision of feedback means including a voltage sensing network responsive to the voltage developed across the load to in turn control the current flow to the load. A zener diode clamp is connected across that voltage sensing network for limiting the feedback voltage applied to the gating circuit within the load steady state current supply and short circuit protection circuit.

BRIEF DESCRIPTION OF THE INVENTION

Briefly described, the circuit embodying the present invention includes a square wave generator, such as an astable or free running flip-flop, for generating a periodic driving voltage having a predetermined duty cycle. A load starting network interconnects an output node of the square wave generator to a load terminal and is responsive to the output voltage of the square wave generator to provide a periodic turn-on current for the load, such as an incandescent lamp connected to the load terminal. Also connected between the square wave generator and the load terminal is a load steady state current supply and short circuit protection circuit. This latter circuit responds to a feedback voltage developed across the load to periodically provide full load current to an electrical load after the latter has been initially energized. Thus, the load steady state current supply and short circuit protection circuit responds to both the square wave generator input and the voltage developed across the load, whereas the load starting network responds only once each cycle to the square wave generator output signal. Under short circuit conditions, the periodic starting current applied to the load by the load starting network is insufficient to damage the circuit due to the current limiting impedance in the load starting network. Full load current is applied to the load only after a feedback voltage of a predetermined magnitude is applied to the load steady state current supply and short circuit protection circuit.

DETAILED DESCRIPTION OF THE INVENTION

Identification of Circuit Components

Figure 1:
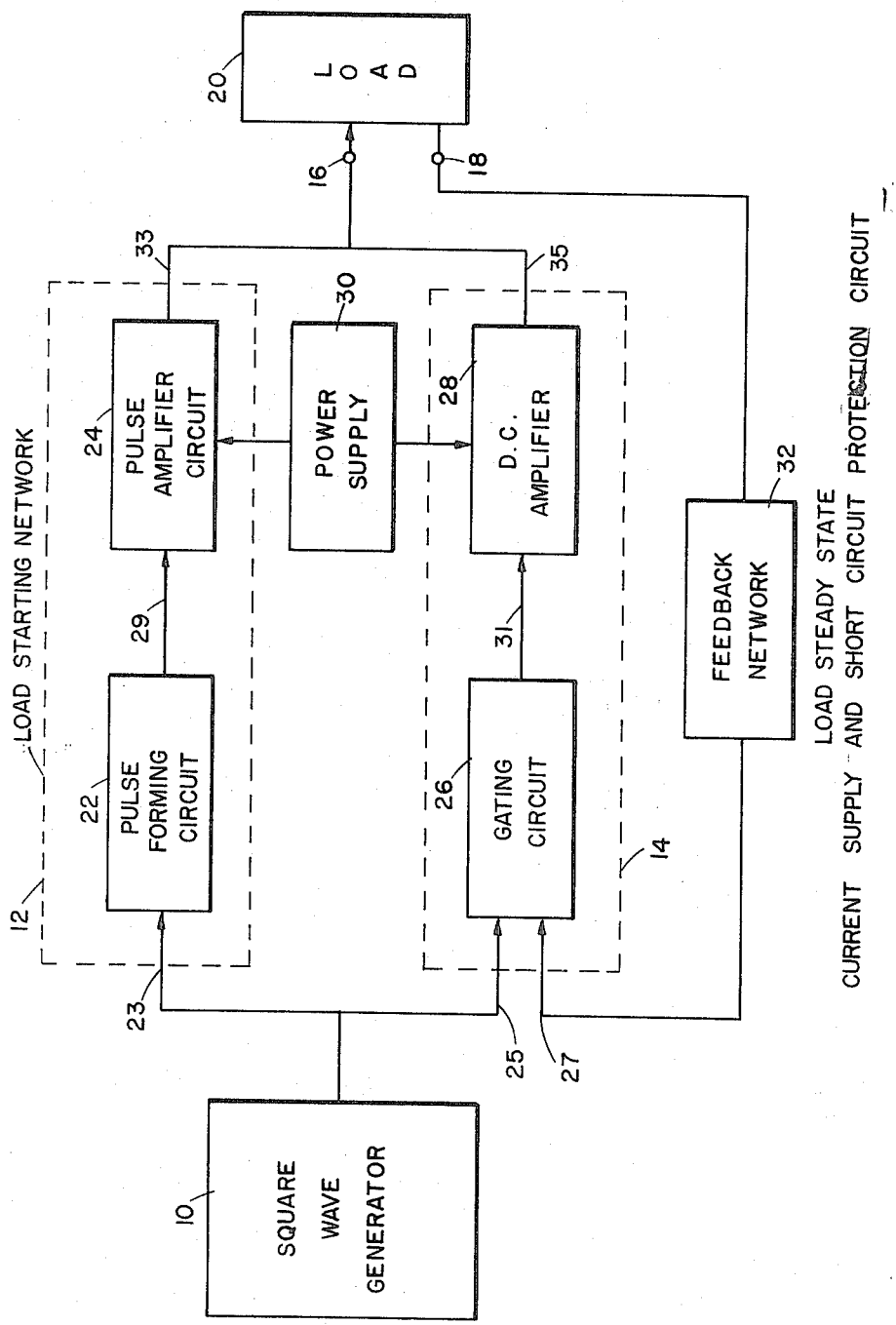
FIG. 1 is a functional block diagram of the power control system of the present invention.
Figure 2:
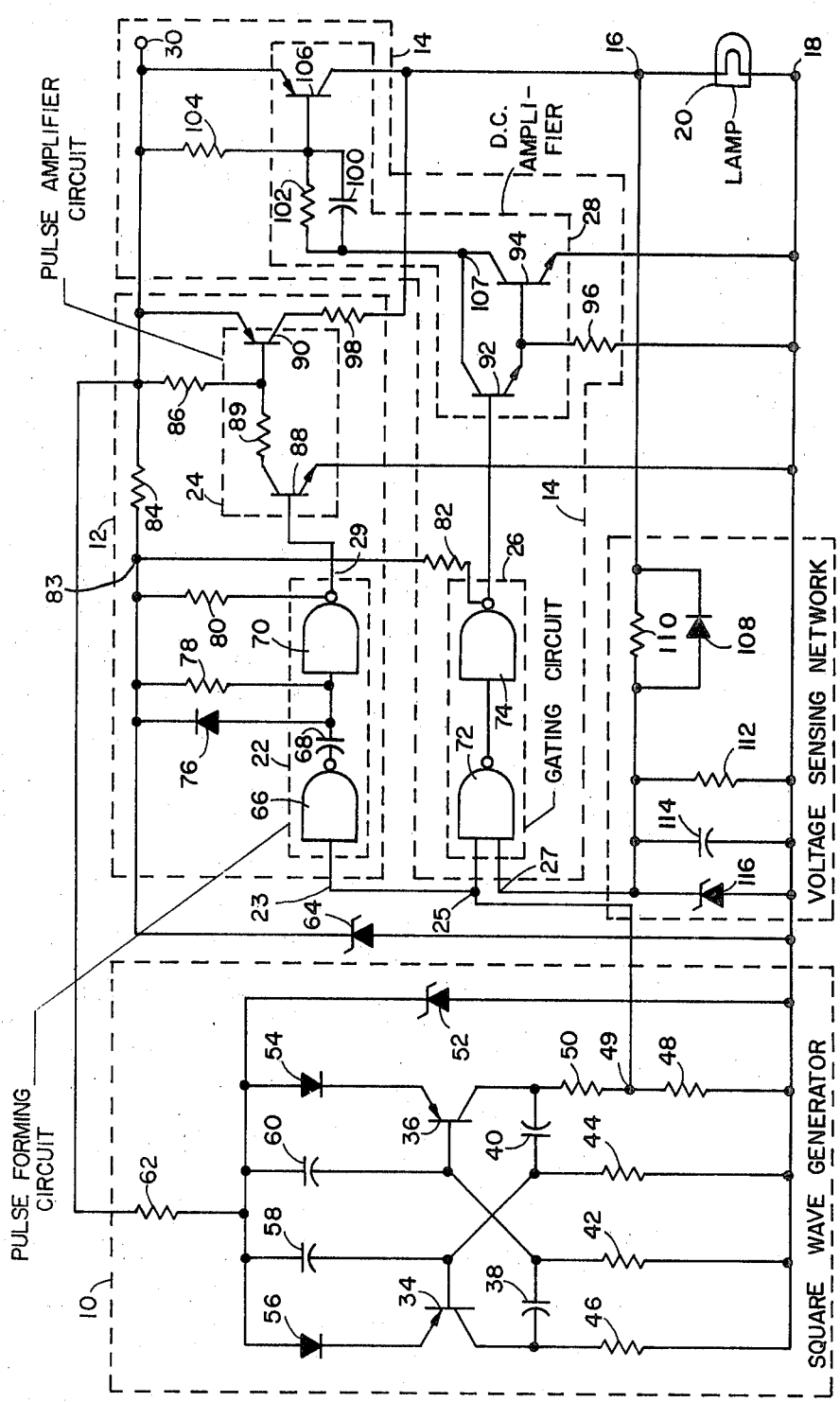
FIG. 2 is a schematic circuit diagram of the invention, and like numerals have been used to designate like components in the two figures.

Reference is now made to FIGS. 1 and 2 of the drawing which shows a driving circuit for the load 20 comprised of a square wave generator 10. In the embodiment of the invention shown, the square wave generator shown is a transistorized astable flip-flop. The square wave generator 10 has a single output node 49 which is connected to both the single input 23 of the load starting network 12 and also to one input 25 of the load steady state current supply and short circuit protection circuit 14. The outputs 33 and 35 of networks 12 and 14 are both connected to a load terminal 16, and an electrical load 20, such as an incandescent lamp, is connected between the load terminals 16 and 18. Load 20 receives an energizing current which is controlled in a manner to be more fully described hereinafter.

The load starting network 12 includes the pulse forming circuit 22 and a pulse amplifier circuit 24 which are connected in cascade between the square wave generator 10 and the load terminal 16. Similarly, the load steady state current supply and short circuit protection network 14 includes a gating circuit 26 cascaded to a DC amplifier 28 between the square wave generator 10 and the load terminal 16. A voltage sensitive feedback network 32 is connected between the load terminal 16 and a second input 27 to the network 14, and the two current supply networks 12 and 14 are connected to a single power supply 30 which is adapted to supply load current through the networks 12 and 14 to the variable electrical load 20.

Referring in more detail to FIG. 2, the square wave generator 10 consists of an astable flip-flop circuit having cross connected PNP transistors 34 and 36 capacitively coupled, collector-to-base, via capacitors 38 and 40, respectively. Base bias resistors 42 and 44 are connected between the respective bases of the PNP transistors 36 and 34 and a point of reference potential. Collector load resistors 46 and 48 interconnect the collectors of PNP transistors 34 and 36 to a point of reference potential, and a voltage divider, including resistors 48 and 50, is connected to the collector of PNP transistor 36. This voltage divider has an intermediate tap 49 thereon from which an output square wave voltage is derived.

Diodes 54 and 56 interconnect the respective emitters of PNP transistors 36 and 34 to a voltage dropping resistor 62, and additional capacitors 58 and 60 are connected between one side of the resistor 62 and the respective bases of PNP transistors 34 and 36. A zener diode clamp 52 is connected across the astable flip-flop portion of the square wave generator 10 as shown. This diode 52 clamps the voltage between one side of resistor 62 and ground potential at the zener voltage of the zener diode 52.

The astable flip-flop which forms the square wave generator 10 includes PNP transistors 34 and 36 and operates in a well known manner wherein transistors 34 and 36 each conduct to the exclusion of the other and alternately and rapidly turn on and off to provide a square wave output voltage at intermediate tap 49 on the voltage divider 48, 50.

The output driving square wave voltage at midpoint 49 is applied simultaneously to the inputs 23 and 25, respectively, of the pulse forming circuit 22 and the gating circuit 26. The pulse forming circuit 22 includes NAND gates 66 and 70 which are capacitively coupled via capacitor 68 as shown, and the input of the gate 70 is clamped by diode 76 which is connected between the input to gate 70 through resistor 84 to power supply terminal 30. A resistor 78 also interconnects the gate 70 with the power supply terminal 83 and is connected in parallel with the clamp diode 76. The circuit described above actually has two voltage supply terminals, one terminal 30 which is at the DC potential of an external source (not shown) and terminal 83 which is clamped at the zener voltage of zener diode 64.

The gating circuit 26 includes a pair of serially and DC connected gates 72 and 74, and the gates 66, 70, 72 and 74 may, for example, be transistor-transistor logic (TTL) or diode transistor (DTL) logic gates, which may form one complete integrated circuit package. One such package is presently sold by applicant's assignee, Motorola, Inc., with the marketing designation of MC857P.

The output 29 of the pulse forming circuit 22 is connected to the base of NPN transistor 88, and transistors 88 and 90 are connected in cascade as shown. A current limiting resistor 98 is connected between the collector of PNP transistor 90 and the load terminal 16. A base current limiting resistor 89 and a base bias resistor 86 are connected as shown to the base of PNP transistor 90, and the operation of these two transistors will be more fully described in the following description of circuit operation.

The steady state current supply network 14 includes a pair of NPN transistors 92 and 94 Darlington connected as shown at the output of the gating circuit 26, and a base "pulldown" resistor 96 is connected between the base of NPN transistor 94 and ground reference potential. This resistor 96 provides the necessary pull down current for turning off NPN transistor 94. A PNP power transistor 106 is connected between the power supply terminal 30 and the load terminal 16, and this power transistor 106 is operative to receive a turn on base drive signal from the common collector node 107 of the transistors 92 and 94. This common collector node 107 is connected via speed up capacitor 100 and resistor 102 to the base of the PNP power transistor 106. A base bias or "pull up" resistor 104 is connected between the base and emitter of the power transistor 106 and provides a turn off bias for the latter power transistor.

A load 20, such as an incandescent lamp requiring different levels of current, is connected across load terminals 16 and 18 as shown, and a voltage sensitive feedback network 32 is connected between the load terminal 16 and a second input 27 of the gating circuit 26. The feedback network 32 includes a diode 108 and resistor 110 connected in parallel between the load terminal 16 and the second input terminal 27 of the gating circuit 26. The feedback network 32 also includes a delay capacitor 114 and divider resistor 112 connected between input 27 and ground reference potential for maintaining a desired charge voltage level at the input 27 of the gating circuit 26. Additionally, a zener diode clamp 116 is connected across the delay capacitor 114 and resistor 112 to clamp the voltage at the input terminal 27 to a predetermined zener level.

Another zener diode 64 is connected between a DC level shifting (and current limiting) resistor 84 and ground potential to apply approximate supply voltage level across the pulse forming and gating circuits 22 and 26. Diode 64 insures that these pulse forming and gating circuits 22 and 26, respectively, will not receive an over-voltage caused, for example, by variations in the power supply voltage at terminal 30.

Operation

For the following consideration of the circuit operation of the present invention in some detail the variable electrical load 20 will be assumed to be an incandescent lamp.

The square wave output driving voltage at intermediate tap 49 on the resistive divider 48-50 is applied as a driving input signal at both the inputs 23 and 25 of the previously described stages 22 and 26. The pulse forming circuit 22, including gates 66 and 70, functions as a monostable multivibrator, so that when the square wave input voltage at input terminal 23 swings high to approximately 5 volts, the output terminal 29 of the pulse forming circuit 22 will also swing high for a given period of time (75 milliseconds in the circuit built and tested) and then return to a predetermined low voltage state. When the output voltage on conductor 29 swings high and is applied to the base of NPN transistor 88, this transistor 88 is turned on, and the current that is caused to flow in resistor 89 produces a negative going voltage transition at the base of PNP transistor 90, turning the latter transistor on. When transistor 90 conducts, a limited value of current flows through current limiting resistor 98 to the load terminal 16. After the lamp 20 is initially energized, the voltage there across begins to rise as the lamp filament heats up. The voltage across the lamp 20 is coupled through the feedback network 32 and into the second input 27 of the gating circuit 26. This positive going voltage transition, upon reaching a predetermined magnitude, drives the output of NAND gate 74 high to turn on the Darlington connected transistors 92 and 94 and produce a negative going voltage transition at the base of the output power transistor 106. This latter going voltage transition turns on the power transistor 106 and thus directly connects the 28 volt power supply at the power supply terminal 30 (minus the saturation voltage, $V_{CE(SAT)}$ of the power transistor 106) to the incandescent lamp 20. Now the lamp 20 is supplied with full load current after the lamp has heated up. For the circuit actually built and tested, the gating circuit 26 was set to switch when the voltage level at terminal 16 reached a magnitude of 7.5 volts.

The resistance divider network comprised of resistor 110 and resistor 112 divides the voltage developed across the lamp 20 to a level acceptable to the input of gate 72. Such level was 5 volts in the circuit actually built and tested.

The function of the delay capacitor 114 in network 32 is to counteract the effects of line inductance between the load terminals 16 and 18. If this inductance is relatively high, the initial spike generated when transistor 90 supplies current to the lamp 20 could cause gate 72 to inadvertently switch. This is true even if the lamp 20 is shorted, and the resulting load current surge could possibly cause transistor 106 to fail. The function of zener diode 116 in the network 32 is to provide added voltage protection to the input 27 of NAND gate 72.

When the conductive state of the astable flip-flop including PNP transistors 34 and 36 changes and the output voltage at node 49 swings low, transistors 88 and 90 and transistors 92, 94 and 106 are turned off until the next positive going voltage transition appears at the output node 49 of the square wave generator 10. Then the cycle previously described repeats itself.

If for some reason the circuit is operated while lamp 20 is shorted, then the drop in voltage across lamp 20 will be insufficient to turn on the gating circuit 26 and thus bias transistors 92, 94 and 106 to conduction, this function of the circuit insures that full supply current will not be supplied to lamp 20 during a short circuit.

If for some reason the lamp 20 is shorted while the lamp is turned on and the voltage at terminal 16 is essentially grounded, the output of the gating circuit 26 will be switched to a low state. This switching action turns off transistor 106 through transistors 92 and 94. The delay capacitor 114 would normally delay the voltage change at terminal 27 in the absence of the diode 108 which forms a low impedance, rapid discharge path for the delay capacitor 114.

During the above described conditions, the pulse forming monostable multivibrator circuit 22 will still operate and drive transistors 88 and 90 to conduction once every cycle of operation of the square wave generator 10. But these transistors 88 and 90 will be turned on each cycle for only about 75 milliseconds, and the current through the current limiting resistor 98 is limited to approximately 20 amperes for this short time duration.

Various modifications may be made to the specific circuit embodiment of the invention shown in FIG. 2 without departing from the true scope of this invention. For example, the above described circuit embodiment of this invention is not limited to controlling the current in incandescent lamps. For example, this circuit invention may be used to control the current as described to a variety of electrical loads. Such electrical loads may include, for example, capacitors or other resistive loads having a high positive temperature coefficient.

The circuit in FIG. 2 may be operated with relatively high lead inductance in series with the lamp 20 and in this case, the value of the capacitor 114 should be adjusted to a larger value than the value given in the table below. This is necessary in order to prevent the gate 72 from being enabled and switched to a different conductive state too early in each pulse received from the square wave generator 10.

TABLE

| Components | Value or Type |
|---|---|
| Capacitors | |
| 58 | 1μf |
| 60 | .022μf |
| 38, 40 | 22μf |
| 114 | .1μf |
| 68 | 30μf, 15V electrolytic or tantalum |
| 100 | .25μf |
| Diodes | |
| 56, 54, 76, 108 | 1N4001 |
| Zener Diodes | |
| 52 | 1N4742 |
| 64, 116 | 1N4733 |
| Transistors | |
| 34, 36 | MPS–6535 |
| 88 | 2N4401 |
| 92 | 2N4400 |
| 94 | 2N4921 |
| 90, 106 | MJE–450 |
| Resistors | (all values ½W unless specified) |
| 62 | 470Ω, 1 watt |
| 46 | 680Ω |
| 42, 44 | 22KΩ |
| 50 | 560Ω |
| 48 | 110Ω |
| 112 | 120Ω |
| 100 | 510Ω |
| 78 | 100KΩ |
| 80, 82 | 150Ω |
| 84 | 200Ω, 5 watt |
| 86, 104, 96 | 1KΩ |
| 89 | 51Ω |
| Resistors | |
| $R_{14}$ | 40Ω, 15 Watts |
| $R_{15}$ | 1.5Ω, 10 Watts |

What is claimed is:

1. Electrical load current control circuitry including, in combination:
    a. means for generating a driving signal having a predetermined duty cycle,
    b. load starting network means connected between said generating means and a load terminal and responsive to said driving signal for providing a first predetermined energizing turn-on current to an electrical load connectable to said load terminal, and
    c. load steady state current supply means coupled to said means for generating a driving signal, connected to said load terminal and responsive to the simultaneous occurrence of a driving signal from said driving means and a predetermined change in voltage across said load for supplying said load with a second predetermined steady state current greater than said first predetermined energizing turn-on current subsequent to an initial current surge when said load is energized, whereby whenever said load is shorted there exists an insufficient change in voltage across said load to cause said load steady state current supply means to supply said load with current, the only current then being supplied being said first predetermined current of said load starting network means.

2. Circuitry defined in claim 1 wherein said load steady state current supply means includes a gating circuit connected between said generating means and said load terminal and responsive to both said driving signal and to said predetermined change in voltage developed across said load for supplying said second predetermined load current to said load.

3. Circuitry defined in claim 1 wherein said load starting network means includes pulse forming circuitry connected between said generating means and said load terminal and responsive to said driving signal for supplying said first predetermined turn-on current to said load to bring the voltage across said load up to said predetermined change in value, said pulse forming circuit being monostable and reverting to its original state a predetermined time after the application thereto of said driving signal.

4. Circuitry defined in claim 1 wherein said generating means is an astable flip-flop for providing a square wave output driving signal having a predetermined duty cycle for periodically driving both said load starting network means and said load steady state current supply means.

5. Circuitry defined in claim 1 wherein said load starting network means includes a pulse amplifier circuit including a current limiting impedance connected between said generating means and said load terminal for providing predetermined said first turn-on current to an electrical load connected to said load terminal.

6. Circuitry defined in claim 1 wherein:
    said load steady state current supply means includes a power transistor connected between a power supply terminal and said load terminal, and means connected to said power transistor for biasing said power transistor into conduction to connect said power supply through said power transistor and to said load terminal to supply said second predetermined current to an electrical load connected to said load terminal.

7. Circuitry defined in claim 1 which further includes feedback means connected between said load terminal and one input of said load steady state current supply means for providing a voltage transition at the input of said load steady state current supply means responsive to said predetermined change in voltage across said load to energize said steady state current supply means to apply said second predetermined current to said load terminal after said electrical load has been initially energized.

8. Circuitry defined in claim 2 wherein said electrical load is a lamp having a given temperature coefficient of resistance so that the voltage developed across said lamp varies with the current through said lamp, said load steady state current supply means further includes a power transistor connected between said power supply terminal and said load terminal and responsive to a signal at the output of said gating circuit to become conductive and connect said second predetermined current to said lamp.

9. Circuitry defined in claim 8 wherein:
a. said load starting network means includes a pulse forming circuit responsive to said driving signal at the output of said generating means for providing a periodic turn on pulse at the output thereof, and
b. said load starting network means further includes a pulse amplifier serially connected to a current limiting impedance between said power supply terminal and said load terminal so that said pulse amplifier is biased conductive upon receiving an output pulse from said pulse forming network to thereby provide said first predetermined current to said lamp.

10. Circuitry defined in claim 9 wherein:
a. said generating means is an astable flip-flop for producing a square wave output signal having a predetermined duty cycle, and
b. said circuitry further including voltage sensitive feedback means connected between said load terminal and one input of said gating circuit for coupling a voltage transition to said gating circuit in response to said predetermined change in voltage across said load to thereby turn-on said power transistor a predetermined time after current begins to flow through said lamp.

11. Circuitry defined in claim 10 wherein said voltage sensitive feedback means includes:
a. an integrating network connected across said electrical load for delaying the voltage rise, there across, and
b. a zener diode clamp connected across said integrating network for limiting the voltage applied to said gating circuit.

* * * * *